United States Patent [19]
Felt

[11] Patent Number: 6,128,742
[45] Date of Patent: Oct. 3, 2000

[54] METHOD OF AUTHENTICATION BASED ON INTERSECTION OF PASSWORD SETS

[75] Inventor: Edward Porter Felt, Matawan, N.J.

[73] Assignee: BEA Systems, Inc., Liberty Corner, N.J.

[21] Appl. No.: 09/025,116

[22] Filed: Feb. 17, 1998

[51] Int. Cl.[7] .................................................. G06F 11/00
[52] U.S. Cl. .......................................................... 713/202
[58] Field of Search ..................................... 713/202, 200, 713/201; 380/4, 23, 25, 9, 29; 340/825.31, 825.34; 235/382.5, 380; 709/224, 225

[56] References Cited

U.S. PATENT DOCUMENTS

| | | | |
|---|---|---|---|
| 5,060,263 | 10/1991 | Bosen et al. ................................ | 380/25 |
| 5,398,285 | 3/1995 | Borgelt et al. .............................. | 380/30 |
| 5,491,750 | 2/1996 | Bellare et al. .............................. | 380/21 |
| 5,537,544 | 7/1996 | Morisawa et al. .................. | 395/188.01 |
| 5,604,803 | 2/1997 | Aziz ........................................... | 380/25 |
| 5,606,663 | 2/1997 | Kadooka ............................. | 395/188.01 |
| 5,689,566 | 11/1997 | Nguyen ...................................... | 380/25 |
| 5,719,941 | 2/1998 | Swift et al. ................................ | 380/25 |
| 5,721,780 | 2/1998 | Ensor et al. ................................ | 380/25 |
| 5,734,718 | 3/1998 | Prafullchandra ............................ | 380/4 |
| 5,751,812 | 5/1998 | Anderson .................................. | 380/48 |
| 5,784,464 | 7/1998 | Akiyama et al. .......................... | 380/25 |
| 5,799,088 | 8/1998 | Raike ......................................... | 380/30 |
| 5,832,211 | 11/1998 | Blakley, III et al. .............. | 395/188.01 |
| 5,881,226 | 3/1999 | Veneklase ........................... | 395/188.01 |
| 5,892,828 | 4/1999 | Perlman .................................... | 380/25 |
| 5,987,232 | 11/1999 | Tabuki ................................ | 395/187.01 |

OTHER PUBLICATIONS http://www–tux/tuxdoc/doc63/docs/tins/chap 1.htm, Chapter 1: Preparing to Install BEA TUXEDO, Online Documentation of BEA TUXEDO System version 6.3 Software, first published Jun. 1997, pp. 1–12 (registration for online support required; see http//www.beasys.com/support/).

http://www–tux/tuxdoc/doc63/docs/sect1/tlisten.htm, Online Documentation of BEA TUXEDO System version 6.3 Software, first published Jun. 1997, pp. 1–4 (registration for online support required; see http://www.beasys.com/support/).

http://www–tux/tuxdoc/doc63/docs/sect1/wlisten.htm, Online Documentation of BEA TUXEDO System version 6.3 Software, first published Jun., 1997, pp. 1–4 (registration for online support required; see http://www.beasys.com/support/).

*Primary Examiner*—Nadeem Iqbal
*Attorney, Agent, or Firm*—Baker Botts, L.L.P.

[57] ABSTRACT

There is disclosed a method of authenticating the identity of a first party involved in communicating over a computer network system. The method comprises the steps of: providing the first party with a first password set; providing a second party with a second password set; transmitting an authentication message based on the first password set from the first party to the second party; and authenticating the identity of the first party by the second party for further communications over the computer network if it is demonstrated, based on an analysis of the authentication message, that the first and second password sets contain at least one common password.

26 Claims, 5 Drawing Sheets

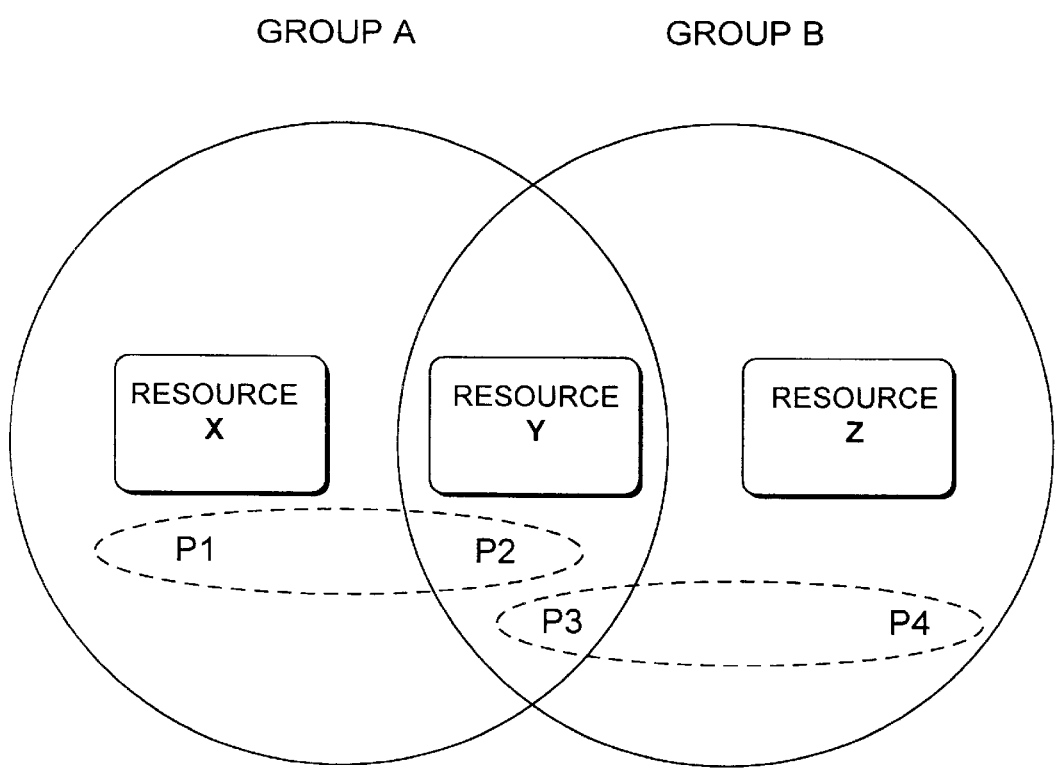
F I G. 2

METHOD OF AUTHENTICATION BASED ON INTERSECTION OF PASSWORD SETS

BACKGROUND OF THE INVENTION

This invention relates to a method of authenticating the identity of a party involved in communicating over a computer network system using the intersection of password sets. As defined in this specification and the appended claims, a party includes a user, a resource, a computer program, and other entities capable of communicating over the network system.

In a computer network system in which users share network resources, the threat exists that unauthorized users may attempt to gain access to the network resources by posing as legitimate users. Additionally, unauthorized users might also create so-called "Trojan horse" programs that pose as legitimate system applications for the purpose of gaining confidential information from network users. Because of these threats, before parties can communicate securely on a network, they must be able to authenticate their identities to each other.

One of the traditional methods to prove a party's identity to another is to demonstrate the knowledge of a shared secret password. An unauthorized user does not know the secret password and, thus, cannot pose as an authorized party.

As networked systems becomes more complex, however, this simple scheme may not be sufficient. As shown in FIG. 1, for example, in some networked systems, different resources may be shared by different groups of users. In the example of FIG. 1, resource X is shared by the users in group A, resource Z is shared by the users in group B, and resource Y is shared by the users in both groups A and B. In this case, at least three secret passwords, Px, Py, and Pz, are necessary to accommodate the proper sharing of resource Y, without allowing the unauthorized sharing of resources X and Z.

Although this type of scheme works well in most cases, a drawback to this scheme is that if the password for resource Y of a user in group A becomes compromised, a new password for resource Y will have to be distributed to users in both groups A and B. Thus, all users will be inconvenienced by the security breach within a single group.

Accordingly, there exists a need for a method of authentication that provides flexibility in the sharing of resources, while at the same time provides convenience in password distribution.

SUMMARY OF THE INVENTION

This invention relates to a method of authenticating the identity of a party involved in communicating over a computer network system using the intersection of password sets. Specifically, in accordance with the present invention, there is provided a method of authenticating the identity of a first party involved in communicating over a computer network system, the method comprising the steps of: providing the first party with a first password set; providing a second party with a second password set; transmitting an authentication message based on the first password set from the first party to the second party; and authenticating the identity of the first party by the second party for further communications over the computer network if it is demonstrated, based on an analysis of the authentication message, that the first and second password sets contain at least one common password.

Advantageously, the method of the present invention provides administrative flexibility by allowing different groups of users to share different resources of a network. At the same time, the method of the present invention provides the administrative convenience of allowing passwords for one group to be changed without affecting the passwords of other groups.

In an exemplary embodiment of the present invention, there is provided a method of authenticating the identity of a first party involved in communicating over a computer network system, the method comprising the steps of: providing the first party with a first password set; providing a second party with a second password set; transmitting the first password set from the first party to the second party; comparing the first password set with the second password set by the second party; and authenticating the identity of the first party by the second party for further communications over the computer network if the first and second password sets contain at least one common password.

In a preferred embodiment of the present invention, there is provided another method of authenticating the identity of a first party involved in communicating over a computer network system, the method comprising the steps of: providing the first party with a first password set; providing a second party with a second password set; forming a first modified password set by operating on the first password set with a predetermined function by the first party; forming a second modified password set by operating on the second password set with the predetermined function by the second party; transmitting the first modified password set from the first party to the second party; comparing the first modified password set with the second modified password set by the second party; and authenticating the identity of the first party by the second party for further communications over the computer network if the first and second modified password sets contain at least one common password.

In yet another preferred embodiment of the present invention, there is provided another method of authenticating the identity of a first party involved in communicating over a computer network system, which comprises the following steps: providing the first party with a first password set; providing a second party with a second password set; generating a first random challenge value by the second party; transmitting the first random challenge value to the first party; forming a first modified password set from the first password set by the first party using the first random challenge value; forming a second modified password set from the second password set by the second party using the first random challenge value; transmitting the first modified password set to the second party; comparing the first and second modified password sets by the second party; and authenticating the identity of the first party by the second party if the first and second modified password sets contain at least one common member.

In a preferred embodiment of the just-described method, the step of forming a first modified password set preferably comprises forming a first hash set by operating on each member of the first password set with a one-way hash function and the first random challenge value. Additionally, it is preferred that the step of forming a second modified password set comprises forming a second hash set by operating on each member of the second password set with the one-way hash function and the first random challenge value.

Additionally, it is further preferred that parties communicating on a network mutually authenticate their identities. Accordingly, if the first and second modified password sets of the above-described method contain at least one common member, preferably the method further comprises the following steps: generating a second random challenge value by the first party; transmitting the second random challenge value to the second party; forming a third modified password set from the first password set by the first party using the second random challenge value; forming a fourth modified password set from the second password set by the second party using the second random challenge value; transmitting the fourth modified password set to the first party; comparing the third and fourth modified password sets; and authenticating the identity of the second party by the first party if the third and fourth modified password sets contain at least one common member.

For use with the method of authentication of the present invention, wherein the first and second password sets include one or more initial common passwords, there is also provided a method of updating passwords comprising the steps of: updating the second password set with one or more new passwords; and updating the first password set with the one or more new passwords after updating the second password set.

Advantageously, the method of updating passwords just described allows passwords shared by several parties communicating over a computer network to be updated gradually over time without disrupting the operation of a distributed system that must be continuously available. As long as the second party (the authenticating party) is given the new passwords before the first party (the party whose identity is to be authenticated), there is no need to further coordinate or synchronize the distribution of the passwords between the parties, since the second party accepts both the old and new passwords from the first party.

Preferably, once the first password set is updated, the one or more initial common passwords are deleted from the first password set. In addition, it is also preferred that the one or more initial common passwords are deleted from the second password set after the one or more initial common passwords are deleted from the first password set.

In accordance with the present invention, a method is provided in which a third party authenticates the identity of a first party to a second party. The method comprises the steps of: providing the first party with a first password set; providing the second party with a second password set; transmitting an authentication message based on the first password set from the first party to the third party; transmitting an authentication message based on the second password set from the second party to the third party; and authenticating the identity of the first party by the third party for further communications over the computer network if it is demonstrated, based on an analysis of the authentication message, that the first and second password sets contain at least one common password.

In accordance with the present invention, a networked computer system is also provided comprising a first terminal and a second terminal. The first terminal has a first password set stored therein and comprises: a first computing means for operating on the first password set with a predetermined function, a first comparing means for comparing the output of the first computing means with a transmitted set of values from the second terminal, and a first transmitting means for transmitting the output of the first computing means to the second terminal. The second terminal has a second password set stored therein and comprises: a second computing means for operating on the second password set with the predetermined function, a second comparing means for comparing the output of the second computing means with a transmitted set of values from the first terminal, and a second transmitting means for transmitting the output of the second computing means to the first terminal.

These and other features, aspects, and advantages of the present invention will become better understood with regard to the following detailed description, appended claims, and accompanying drawings.

BRIEF DESCRIPTION OF THE DRAWINGS

FIG. 2 is a diagram of two groups of users sharing resources in a networked system in accordance with a preferred embodiment of the present invention;

DETAILED DESCRIPTION

FIG. 2 provides a diagram of two groups of users sharing resources in a networked system in accordance with the present invention. Group A shares resources X and Y, and group B shares resources Y and Z. In accordance with the present invention, the password set {P1} is stored with resource X; the password set {P4} is stored with resource Z; and the password set {P2, P3} is stored with resource Y. In addition, the users of group A are given the password set {P1, P2}, and the users of group B are given the password set {P3, P4}.

To authenticate the identity of a user attempting to gain access to a resource, the password set given to a user must be compared with the password set stored with a resource. If at least one of the passwords in the password sets is the same, authentication is accomplished. For example, for a user in group A to gain access to resource Y, the password set {P1, P2} of the user must be compared to the password set {P2, P3} stored with resource Y. Since the two password sets contain the common password P2, authentication is accomplished, and the user may gain access to resource Y. On the other hand, if a user in group A attempts to gain access to resource Z, a comparison of the user's password set {P1, P2} with the resource's password set {P4} will not produce a common password, and authentication will fail.

Figure 1:
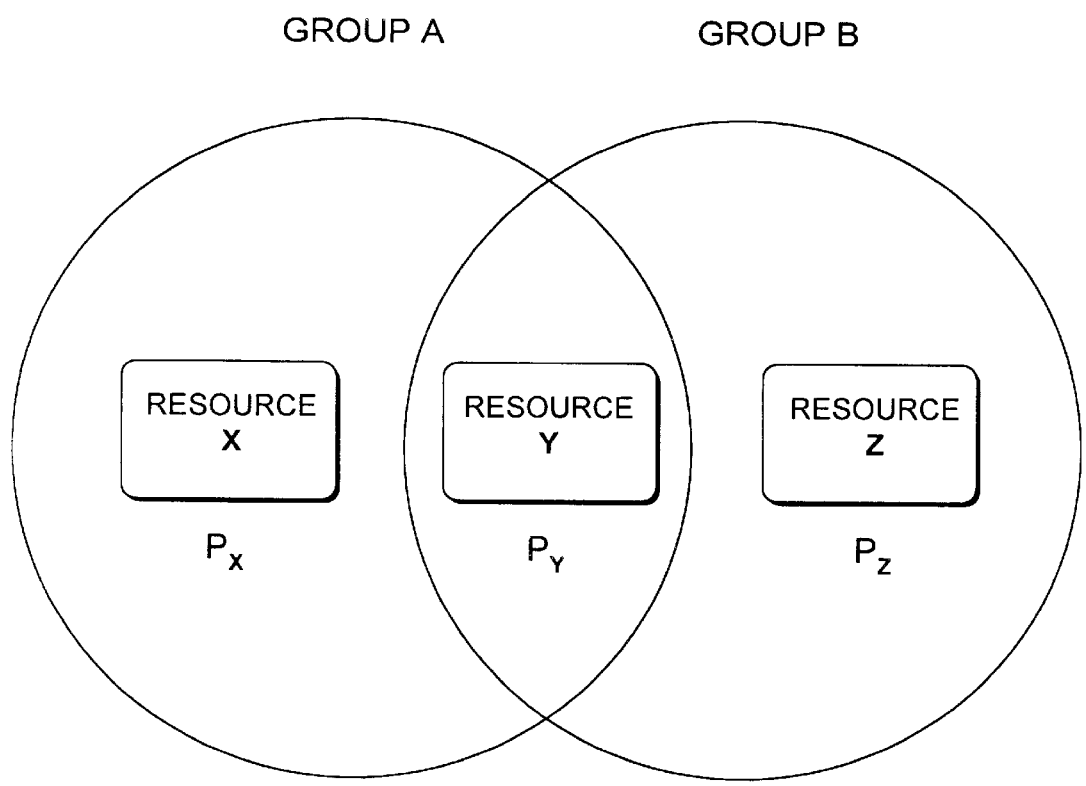
FIG. 1 is a diagram of two groups of users sharing resources in a networked system.
Figure 3A:
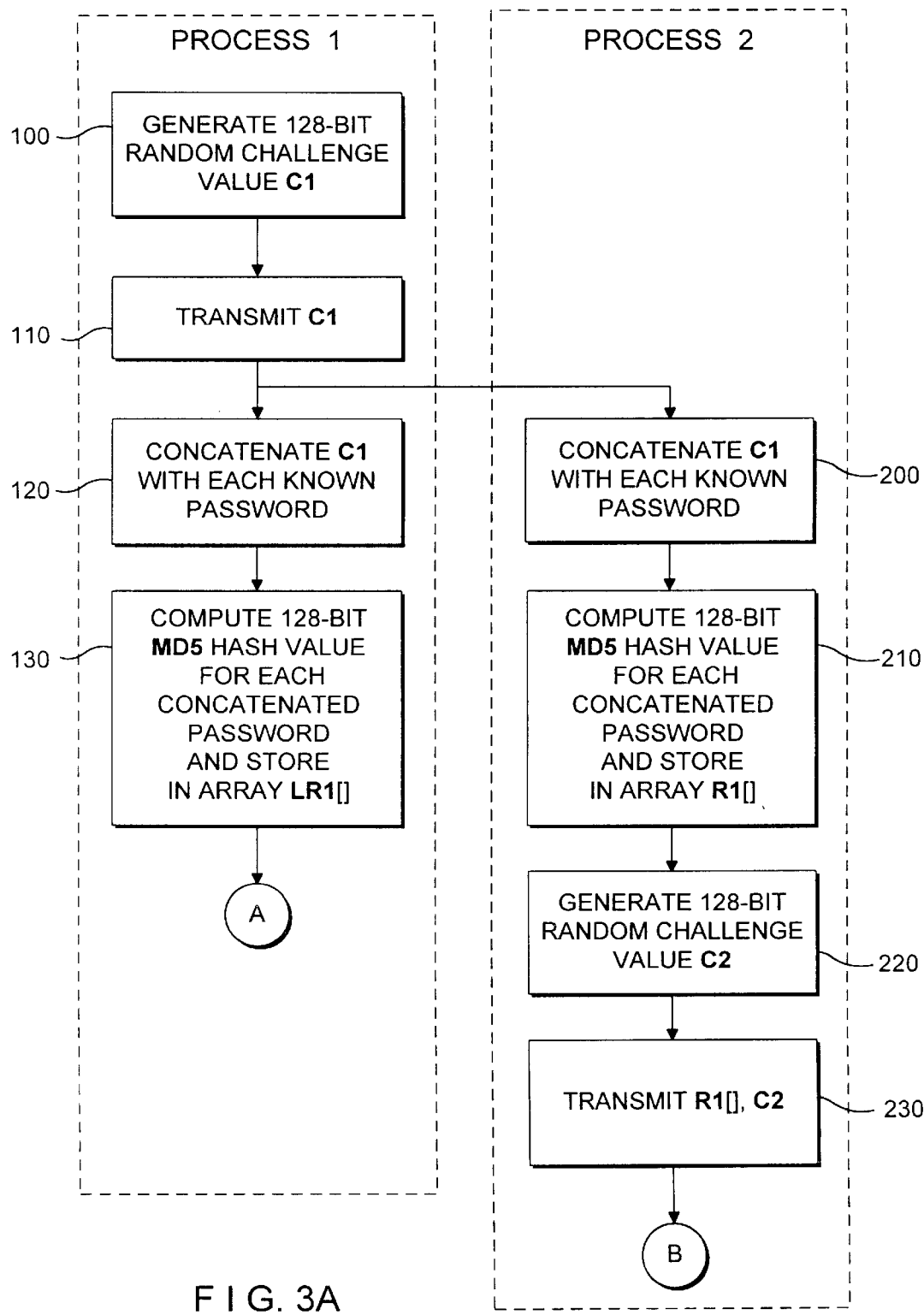
FIGS. 3A and 3B provide a flowchart of a method for mutual authentication of parties according to another preferred embodiment of the present invention.
Figure 3B:
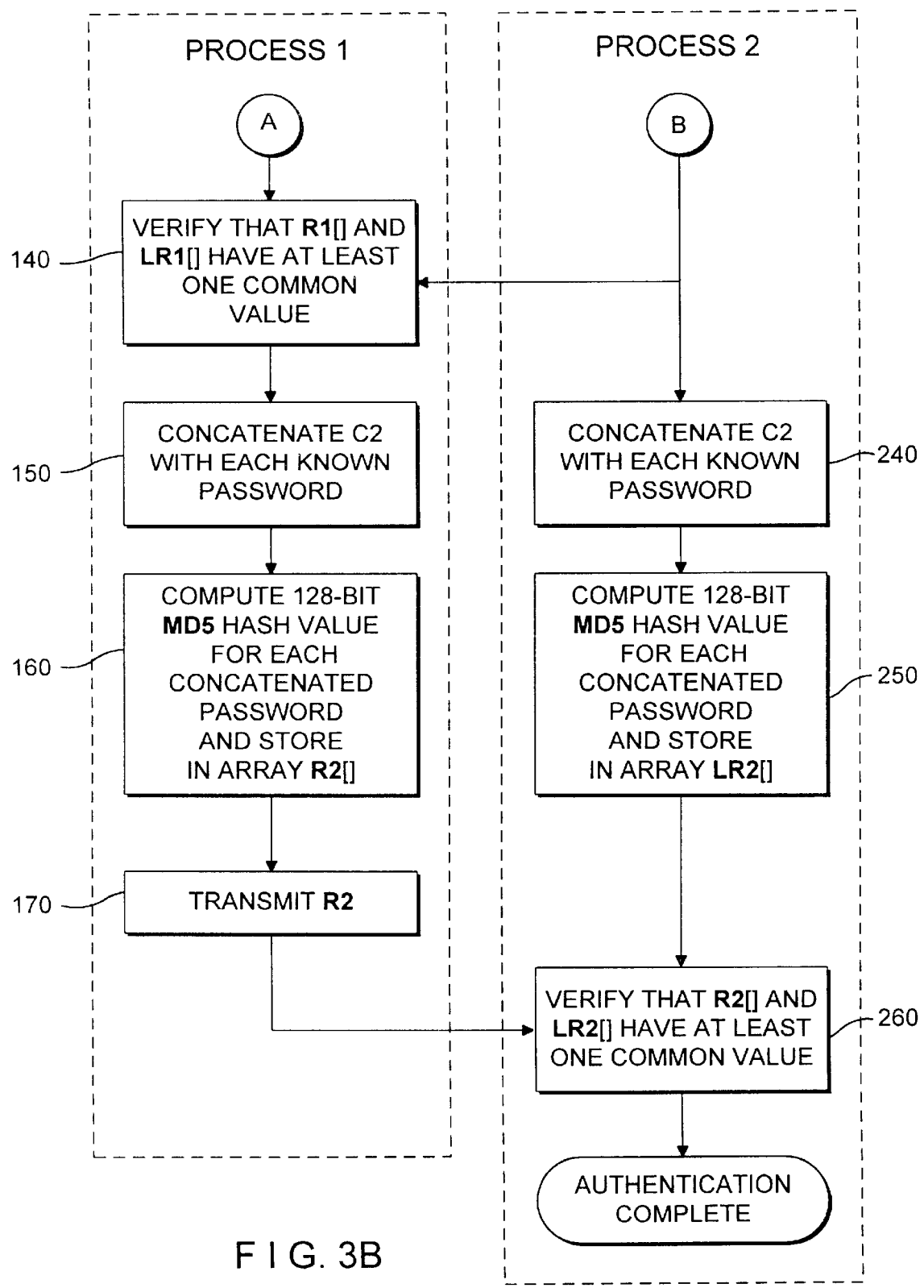

Preferably, whenever two parties on a network attempt to communicate with each other, they should perform mutual authentication of their identities. FIGS. 3A and 3B provide a flowchart of a preferred embodiment of a method for mutual authentication according to the present invention.

The preferred embodiment of FIGS. 3A and 3B utilizes several advantageous features. First, this embodiment utilizes the transmission of a random challenge value by each party seeking to authenticate the identity of the other. A random challenge value is a random number that is generated by one party and transmitted to another party and that both parties use to generate modified password sets according to a predetermined function.

For example, suppose that parties A and B have password sets $P_A$ and $P_B$, respectively. The parties agree on a predetermined function, which is preferably a one-way function. A one-way function is a function that is easy to perform in one direction, but which is computationally infeasible to invert. Thus, if H is a one-way function, given x, H(x) is easy to compute, but given H(x), x is computationally infeasible to compute. Party A then generates a random number R and transmits it to party B. Parties A and B then generate modified password sets $P_A'$ and $P_B'$, respectively, by operating the predetermined function and the random number R on their respective password sets. Party B then transmits its modified password set $P_B'$ to party A. Party A compares $P_A'$ to $P_B'$ to determine whether the two sets contain a common value. If the sets contain a common value, party A authenticates the identity of party B. If not, authentication fails. For mutual authentication of the two parties, party B generates a second random challenge value and the process repeats itself, with the roles of the parties reversed.

The advantage of using random challenge values is, of course, well known in the art. By using random challenge values, a party does not transmit its actual password set over the network. Thus, other parties on the network and unauthorized users observing network traffic cannot intercept a party's actual password set. In addition, unauthorized users who record network traffic will not be able to replay communications between parties at a later time and thereby gain access to resources because the use of a random challenge value produces a different modified password set each time.

The embodiment of FIGS. 3A and 3B also utilizes a hash function in relation to the transmission of modified password sets between parties. A hash function is a transformation that takes a variable-size input and produces a fixed-size output. Hash functions are typically used to reduce the size of messages sent over a network, and thereby to increase the speed and efficiency of communication over the network. As a concise representation of the longer message, hash functions act as a sort of "digital fingerprint" of the longer message. When used additionally for crytographic purposes, hash functions are required to be one-way functions. Examples of well-known one-way hash functions are MD5, SHA, and SHA-1.

Referring now to FIG. 3A, process 1 initiates the mutual authentication in step 100 by generating a random challenge value C1, which is preferably at least 128 bits long. In step 110, the random challenge value C1 is transmitted to process 2. Simultaneously, in steps 120 and 200, process 1 and process 2 take the random challenge C1 and concatenate it with each member of their respective password sets. In steps 130 and 210, processes 1 and 2 compute a 128-bit MD5 hash value for each concatenated password set member. These hash values are stored in arrays LR1[] and R1[] for processes 1 and 2, respectively.

In step 220, process 2 generates a second random challenge value C2. In step 230, process 2 transmits the hash array R1[] and the random challenge value C2 to process 1. Preferably, before the hash array R1[] is transmitted to process 1, it is padded with random data to fit a predetermined array size. In this way, it will be difficult for process 1 and other network observers to determine the number of passwords associated with process 2.

Referring to FIG. 3B, process 1 receives array R1[] and random challenge value C2 in step 140. In that same step, process 1 determines whether arrays R1[] and LR1[] contain any common values. If they do, then process 1 has authenticated process 2. If they do not, then authentication has failed, and process 1 preferably generates a security violation log entry, sleeps for a predetermined amount of time (say, five seconds), and then disconnects from process 2.

If process 1 authenticates process 2, mutual authentication continues in steps 150 and 240. In steps 150 and 240, process 1 and process 2 concatenate random challenge value C2 with each member of their respective password sets. In steps 160 and 250, process 1 and process 2 compute a 128-bit MD5 hash value for each concatenated password set member. These hash values are stored in arrays R2[] and LR2[] for processes 1 and 2, respectively.

In step 170, process 1 transmits the hash array R2[] to process 2. Again, it is preferred that before the hash array R2[] is transmitted to process 2, it is padded with random data to fit a predetermined array size, making it difficult for process 2 and other network observers to determine the number of passwords associated with process 1.

In step 260, process 2 determines whether array R2[] and array LR2[] contain any common values. If they do, then process 2 has authenticated process 1, and mutual authentication is complete. If they do not, then authentication has failed, and process 2 preferably generates a security violation log entry, sleeps for a predetermined amount of time, and then disconnects from process 1.

Figure 4:
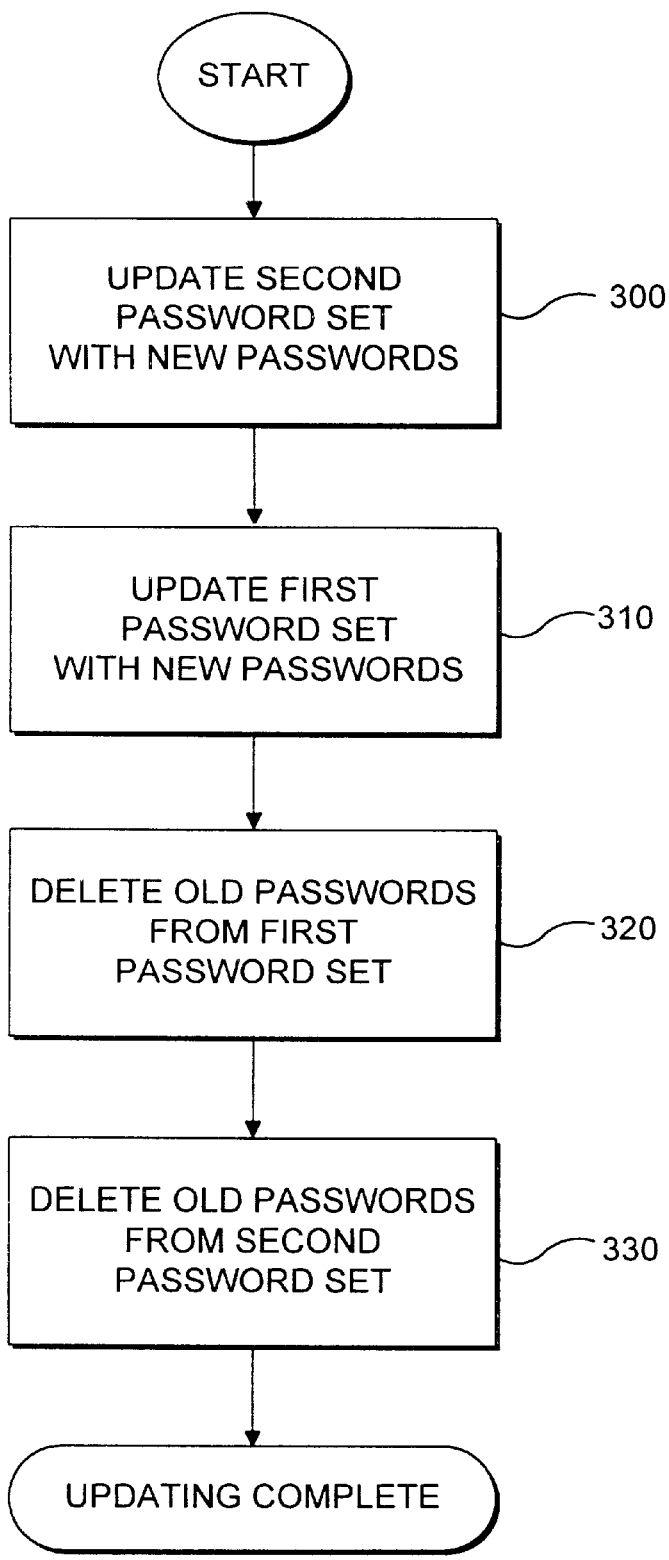
FIG. 4 provides a flowchart of a method of updating password sets used to authenticate the identity of a party involved in communicating over a computer network system according to another preferred embodiment of the present invention.

FIG. 4 provides a flowchart of a method of updating password sets used to authenticate the identity of a party involved in communicating over a computer network system in accordance with another preferred embodiment of the present invention. Assuming that a first party (a party seeking to be authenticated) has been given a first password set and a second party (a party performing the authentication) has been given a second password set, and that the first and second password sets include one or more common passwords, the method of updating the passwords of the parties begins in step 300 by updating the second password set with the new passwords. Once the second password set is updated, the first password set is also updated with the new passwords in step 310. The manner of updating the password sets may be accomplished either by adding the new passwords to the password sets or by providing entire new password sets containing the new passwords. After the first password set is updated, in step 320, the old passwords are deleted from the first password set. Once the old passwords are deleted from the first password set, the old passwords are also deleted from the second password set in step 330.

Advantageously, the method of updating password sets illustrated in FIG. 4 allows passwords shared by several parties communicating over a computer network to be updated gradually over time without disrupting the operation of a distributed system that must be continuously available. As long as each of the steps is performed in order, there is no need to further coordinate or synchronize the distribution of the new passwords or the deletion of the old passwords between the parties, since the second party accepts both the old and new passwords from the first party (until the last step). Therefore, the updating of password sets is performed conveniently and without the need to disrupt the operation of the system.

Although the present invention has been described with reference to certain preferred embodiments, various modifications, alterations, and substitutions will be known or obvious to those skilled in the art without departing from the spirit and scope of the invention, as defined by the appended claims. For example, a trusted third party might perform the authentication of password sets of two parties and thereby mutually authenticate the identities of the two parties.

I claim:

1. A method of authenticating the identity of a particular party involved in communicating over a computer network system, the method comprising the steps of:

providing a first party with a first password set, the first password set being stored on a first storage device of the first party;

providing a second party with a second password set, the second password set being stored on a second storage device of the second party;

transmitting an authentication message based on the first password set from the first party to the second party; and authenticating the identity of the first party by the second party for further communications over the computer network if it is demonstrated, based on an analysis of the authentication message, that the first and second password sets contain at least one common password.

2. A method of updating password sets used to authenticate the identity of a party involved in communicating over a computer network system according to the method of claim 1, wherein the first and second password sets include one or more initial common passwords, the method of updating password sets comprising the steps of:

updating the second password set with one or more new passwords; and updating the first password set with the one or more new passwords after updating the second password set.

3. The method of claim 2, further comprising the step of deleting the one or more initial common passwords from the first password set after the step of updating the first password set.

4. The method of claim 3, further comprising the step of deleting the one or more initial common passwords from the second password set after the step of deleting the one or more initial common passwords from the first password set.

5. A method of authenticating the identity of a particular party involved in communicating over a computer network system, the method comprising the steps of:

providing a first party with a first password set, the first password set being stored on a first storage device of the first party;

providing a second party with a second password set, the second password set being stored on a second storage device of the second party;

transmitting the first password set from the first party to the second party;

comparing the first password set with the second password set by the second party; and authenticating the identity of the first party by the second party for further communications over the computer network if the first and second password sets contain at least one common password.

6. A method of updating password sets used to authenticate the identity of a party involved in communicating over a computer network system according to the method of claim 5, wherein the first and second password sets include one or more initial common passwords, the method of updating password sets comprising the steps of:

updating the second password set with one or more new passwords; and updating the first password set with the one or more new passwords after updating the second password set.

7. The method of claim 6, further comprising the step of deleting the one or more initial common passwords from the first password set after the step of updating the first password set.

8. The method of claim 7, further comprising the step of deleting the one or more initial common passwords from the second password set after the step of deleting the one or more initial common passwords from the first password set.

9. A method of authenticating the identity of a particular party involved in communicating over a computer network system, the method comprising the steps of:

providing a first party with a first password set;

providing a second party with a second password set;

forming a first modified password set by operating on the first password set with a predetermined function by the first party;

forming a second modified password set by operating on the second password set with the predetermined function by the second party;

transmitting the first modified password set from the first party to the second party;

comparing the first modified password set with the second modified password set by the second party; and authenticating the identity of the first party by the second party for further communications over the computer network if the first and second modified password sets contain at least one common password.

10. A method of updating password sets used to authenticate the identity of a party involved in communicating over a computer network system according to the method of claim 9, wherein the first and second password sets include one or more initial common passwords, the method of updating password sets comprising the steps of:

updating the second password set with one or more new passwords; and updating the first password set with the one or more new passwords after updating the second password set.

11. The method of claim 10, further comprising the step of deleting the one or more initial common passwords from the first password set after the step of updating the first password set.

12. The method of claim 11, further comprising the step of deleting the one or more initial common passwords from the second password set after the step of deleting the one or more initial common passwords from the first password set.

13. A method of authenticating the identity of a particular party involved in communicating over a computer network system, the method comprising the steps of:

providing a first party with a first password set;

providing a second party with a second password set;

generating a first random challenge value by the second party;

transmitting the first random challenge value to the first party;

forming a first modified password set from the first password set by the first party using the first random challenge value;

forming a second modified password set from the second password set by the second party using the first random challenge value;

transmitting the first modified password set to the second party;

comparing the first and second modified password sets by the second party; and authenticating the identity of the first party by the second party if the first and second modified password sets contain at least one common member.

14. The method of claim 13, wherein the step of forming a first modified password set comprises forming a first hash set by operating on each member of the first password set with a one-way hash function and the first random challenge value; and wherein the step of forming a second modified password set comprises forming a second hash set by operating on each member of the second password set with the one-way hash function and the first random challenge value.

15. The method of claim 13, wherein, if the first and second modified password sets contain at least one common member, further comprising the steps of:

generating a second random challenge value by the first party;

transmitting the second random challenge value to the second party;

forming a third modified password set from the first password set by the first party using the second random challenge value;

forming a fourth modified password set from the second password set by the second party using the second random challenge value;

transmitting the fourth modified password set to the first party;

comparing the third and fourth modified password sets; and authenticating the identity of the second party by the first party if the third and fourth modified password sets contain at least one common member.

16. A method of updating password sets used to authenticate the identity of a party involved in communicating over a computer network system according to the method of claim 13, wherein the first and second password sets include one or more initial common passwords, the method of updating password sets comprising the steps of:

updating the second password set with one or more new passwords; and updating the first password set with the one or more new passwords after updating the second password set.

17. The method of claim 16, further comprising the step of deleting the one or more initial common passwords from the first password set after the step of updating the first password set.

18. The method of claim 17, further comprising the step of deleting the one or more initial common passwords from the second password set after the step of deleting the one or more initial common passwords from the first password set.

19. A method of authenticating the identity of a particular party involved in communicating over a computer network system, the method comprising the steps of:

providing a first party with a first password set;

providing a second party with a second password set;

transmitting a first authentication message, which is based on the first password set and a predetermined criteria, from the first party to a third party;

transmitting a second authentication message which is based on the second password set and the predetermined criteria, from the second party to the third party; and authenticating the identity of the first party by the third party for further communications over the computer network if it is demonstrated, based on an analysis of the first and second authentication messages, that the first and second password sets contain at least one common password.

20. A networked computer system comprising:

a first terminal and a second terminal;

the first terminal having stored therein a first password set and comprising:

a first computing means for operating on the first password set with a predetermined function, a first comparing means for comparing the output of the first computing means with a transmitted set of values from the second terminal, and a first transmitting means for transmitting the output of the first computing means to the second terminal; and the second terminal having stored therein a second password set and comprising:

a second computing means for operating on the second password set with the predetermined function, a second comparing means for comparing the output of the second computing means with a transmitted set of values from the first terminal, and a second transmitting means for transmitting the output of the second computing means to the first terminal.

21. The method of claim 1, wherein, if the first and second password sets contain at least one common member, further comprising the steps of:

transmitting a further authentication message, which is based on the second password set, from the second party to the first party; and authenticating the identity of the second party by the first party if, based on the analysis of the further authentication message, the first party determines that the first and second password sets contain at least one common member.

22. The method of claim 5, wherein, if the first and second modified password sets contain the at least one common member, further comprising the steps of:

transmitting a further authentication message from the second party to the first party; and after the further authentication message is transmitted, authenticating the identity of the second party if the first party determines that the first and second password sets contain at least one common member.

23. The method of claim 9, wherein, if the first and second modified password sets contain at least one common member, further comprising the steps of:

forming a third modified password set by operating on the first password set with a further predetermined function by the first party;

forming a fourth modified password set by operating on the second password set with the further predetermined function by the second party;

transmitting the fourth modified password set from the second party to the first party; and authenticating the identity of the second party if the first party determines that the third and fourth modified password sets contain at least one common member.

24. The method of claim 13, wherein, if the first and second modified password sets contain at least one common member, further comprising the steps of:

generating a second random challenge value by the first party;

transmitting the second random challenge value to the second party;

forming a third modified password set from the first password set by the first party using the second random challenge value;

forming a fourth modified password set from the second password set by the second party using the second random challenge value;

transmitting the fourth modified password set from the second party to the first party; and authenticating the identity of the second party if the first party determines that the third and fourth modified password sets contain at least one common member.

25. The method of claim 19, wherein, if the first and second password sets contain at least one common member, further comprising the steps of:

transmitting a further authentication message from the second party to the first party;

transmitting a third authentication message, which is based on the first password set and a further predetermined criteria, from the first party to a third party;

transmitting a fourth authentication message, which is based on the second password set and the further predetermined criteria, from the second party to the third party; and authenticating the identity of the second party if, based on the analysis of the third and fourth authentication messages, the first party determines that the first and second password sets contain at least one common member.

26. A networked computer system, comprising:

a first terminal; and a second terminal, wherein the first terminal has stored therein a first password set, and comprising:

a first computing arrangement operating on the first password set using a predetermined function and generating a first output, a first comparing arrangement comparing the first output to a transmitted set of values from the second terminal, and a first transmitting arrangement transmitting the first output to the second terminal, and wherein the second terminal has stored therein a second password set, and comprising:

a second computing arrangement operating on the second password set using the predetermined function and generating a second output, a second comparing arrangement comparing the second output to a transmitted set of values from the first terminal, and a second transmitting arrangement transmitting the second output to the first terminal.

* * * * *